W. J. HOTCHKISS.
MOWER.
APPLICATION FILED JUNE 10, 1916.
1,196,239.
Patented Aug. 29, 1916.
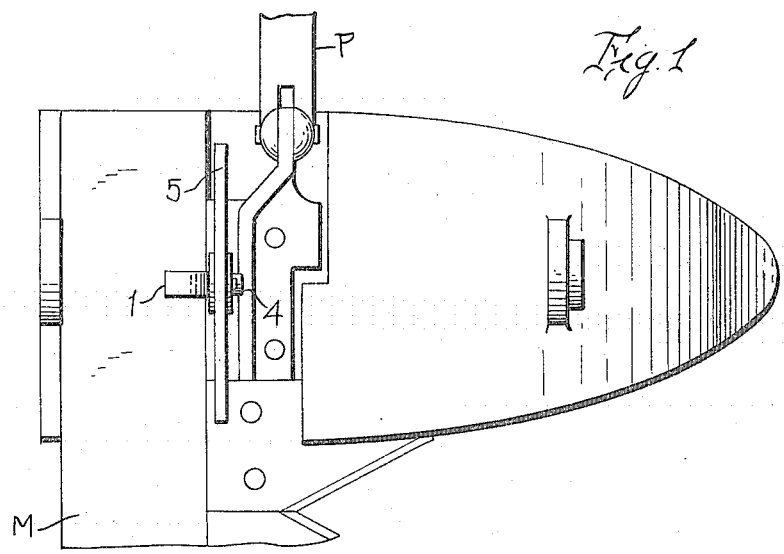
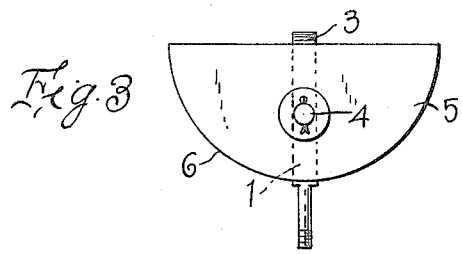
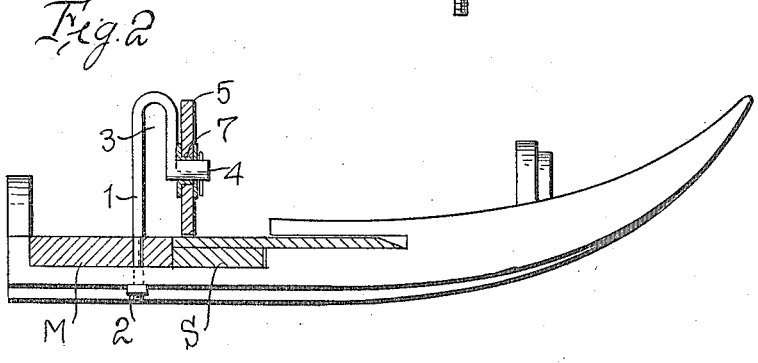
Inventor
WALLACE J. HOTCHKISS
By Watson E. Coleman
Attorney

UNITED STATES PATENT OFFICE.

WALLACE J. HOTCHKISS, OF ALPENA, SOUTH DAKOTA.

MOWER.

1,196,239. Specification of Letters Patent. Patented Aug. 29, 1916.

Application filed June 10, 1916. Serial No. 102,986.

*To all whom it may concern:*

Be it known that I, WALLACE J. HOTCHKISS, a citizen of the United States, residing at Alpena, in the county of Jerauld and State of South Dakota, have invented certain new and useful Improvements in Mowers, of which the following is a specification, reference being had to the accompanying drawings.

This invention relates to certain improvements in mowers and has relation more particularly to a novel and improved means for maintaining the sickle bar in applied position upon the mower bar.

The invention also has for an object to provide novel and improved means coacting with the portion of the sickle bar with which the operating pitman is connected for maintaining said sickle bar in applied position.

The invention has for a still further object to provide a novel and improved retaining device coacting with the sickle bar whereby the portion of the sickle bar engaged with the operating pitman is maintained in a proper engagement with the mower bar and whereby said sickle bar is permitted to reciprocate with a minimum of resistance.

The invention consists in the details of construction and in the combination and arrangement of the several parts of my improved mower whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in top plan of the inner end of a mower bar illustrating an embodiment of my invention in applied position; Fig. 2 is a longitudinal sectional view taken through Fig. 1 and illustrating certain details of my invention as herein set forth; and Fig. 3 is a view in elevation of my improved attachment, detached.

As disclosed in the accompanying drawings, M denotes a mower bar of any ordinary or preferred construction and with which coacts in a conventional manner the sickle bar S, said sickle bar being operatively engaged with the inner end of the pitman P for imparting the requisite reciprocation to the sickle bar.

1 denotes an upstanding post secured at its lower end as at 2 to the mower bar M adjacent its inner end and the upper portion of said post is returned as at 3 and terminates in the laterally directed stub shaft 4 in perpendicular relation to the post 1.

5 denotes a head substantially semi-circular in form and mounted mid-way of its length for rocking movement upon the stub shaft 4. The lower or rounded edge 6 is directed to coact with the inner end of the sickle bar S and maintain said inner end portion of the sickle bar in proper contact with the mower bar M.

It will be perceived that the rocking movement of the head 5 will permit the requisite reciprocation of the sickle bar S with a minimum of frictional resistance and with materially less power than is required in connection with mowers as generally constructed. It has also been found in practice that the coaction of the head 5 with the sickle bar S materially facilitates the operation of the sickle bar in hard cutting and to materially reduce the possibility of the sickle bar or pitman from breaking as it will be noted that the coaction of the head 5 with the sickle bar prevents binding of the sickle bar. I have also found it of especial import in practice to employ the bearing sleeve 7 mounted upon the axle of the stub shaft 4 and with which the head 5 directly engages. By this arrangement it will be perceived that the possibility of friction between the head 5 and the stub shaft 4 during the operation of the sickle bar is substantially entirely obviated. It is also to be noted that the head 5 is mounted upon the stub shaft 4 in such a manner as to travel in a plane perpendicular to the sickle bar and which arrangement has also proved essential in practice, and it is to be understood that the head 5 is so set as to be timed with the pitman so that the same will operate in unison and in the same general direction.

From the foregoing description, it is thought to be obvious that a mower constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

Having described my invention, what I claim is:

1. In combination with a mower bar and a sickle bar mounted for reciprocation thereon, an upstanding post carried by the mower bar adjacent its inner end, the upper portion of said post being returned, the returned portion of the post being provided with a stub shaft disposed perpendicularly to the post, and a head rotatably supported by the shaft and having a rounded edge engageable with the sickle bar.

2. In combination with a mower bar and a sickle bar mounted for reciprocation thereon, an upstanding post carried by the mower bar adjacent its inner end, the upper portion of said post being returned, the returned portion of the post being provided with a stub shaft disposed perpendicularly to the post, a head rotatably supported by the shaft and having a rounded edge engageable with the sickle bar, and anti-friction means carried by the stub shaft and coacting with the head.

In testimony whereof I hereunto affix my signature in the presence of two witnesses.

WALLACE J. HOTCHKISS.

Witnesses:
G. E. CHILDS,
M. A. MANWARING.

Copies of this patent may be obtained for five cents each, by addressing the "Commissioner of Patents, Washington, D. C."